United States Patent
De Ren et al.

(10) Patent No.: US 12,415,960 B2
(45) Date of Patent: Sep. 16, 2025

(54) PROCESS FOR REGENERATING CATALYST FROM A FLUIDIZED CATALYTIC PROCESS

(71) Applicant: UOP LLC, Des Plaines, IL (US)

(72) Inventors: Jan De Ren, Bracknell (GB); Sakthivelan Maadasamy Durai, Gurugram (IN); Rakshit Mehta, Kolkata (IN)

(73) Assignee: UOP LLC, Rosemont, IL (US)

( * ) Notice: Subject to any disclaimer, the term of this patent is extended or adjusted under 35 U.S.C. 154(b) by 232 days.

(21) Appl. No.: 18/139,814

(22) Filed: Apr. 26, 2023

(65) Prior Publication Data

US 2024/0158703 A1    May 16, 2024

(51) Int. Cl.
*B01J 38/02* (2006.01)
*B01J 38/06* (2006.01)
*B01J 38/32* (2006.01)
*C10G 11/18* (2006.01)

(52) U.S. Cl.
CPC ............. *C10G 11/182* (2013.01); *B01J 38/02* (2013.01); *B01J 38/06* (2013.01); *B01J 38/32* (2013.01)

(58) Field of Classification Search
CPC ... B01J 23/92; B01J 38/02; B01J 38/06; B01J 38/12; B01J 38/30; B01J 38/32; C10G 11/182
See application file for complete search history.

(56) References Cited

U.S. PATENT DOCUMENTS

2011/0247336 A9* 10/2011 Farsad .................. B01D 53/78
                                                                    60/685
2021/0324278 A1* 10/2021 Montalbano ........... B01J 8/1863

* cited by examiner

*Primary Examiner* — Ellen M McAvoy
*Assistant Examiner* — Chantel Graham
(74) *Attorney, Agent, or Firm* — Paschall & Associates, LLC; James C. Paschall

(57) ABSTRACT

A process for regenerating catalyst from a fluidized catalytic process is disclosed. The process comprises passing a $CO_2$ oxidation stream to a regenerator in which coke is combusted from catalyst to provide a $CO_2$ rich flue gas stream. The $CO_2$ rich flue gas stream is separated into an underflow stream comprising catalyst fines and a $CO_2$ rich flue gas overflow stream. The overflow stream is separated into a recycle stream and a power recovery stream. The recycle stream of the overflow stream is recycled to the regenerator.

20 Claims, 3 Drawing Sheets

PROCESS FOR REGENERATING CATALYST FROM A FLUIDIZED CATALYTIC PROCESS

CROSS-REFERENCE TO RELATED APPLICATIONS

This application claims priority from Indian Provisional Application No. 202211065724, filed Nov. 16, 2022, which is incorporated herein in its entirety.

FIELD

The field is related to a process for regenerating catalyst from a fluidized catalytic process. Particularly, the field relates to a process for regenerating catalyst from a fluidized catalytic process with a CO2 recycle stream.

BACKGROUND

Catalytic cracking can create a variety of products from larger hydrocarbons. Often, a feed of a heavier hydrocarbon, such as a vacuum gas oil, is provided to a catalytic cracking reactor, such as a fluid catalytic cracking reactor. Various products may be produced from such a system, including a gasoline product and/or light product such as propene and/or ethene.

Fluid catalytic cracking (FCC) is a hydrocarbon conversion process accomplished by contacting hydrocarbons in a fluidized reaction zone with a catalyst composed of finely divided particulate material. The reaction in catalytic cracking, as opposed to hydrocracking, is carried out in the absence of substantial added hydrogen or the consumption of hydrogen. As the cracking reaction proceeds substantial amounts of highly carbonaceous material referred to as coke is deposited on the catalyst. A high temperature regeneration operation within a regenerator zone combusts coke from the catalyst. Coke-containing catalyst, referred to herein as coked catalyst, is continually removed from the reaction zone and replaced by essentially coke-free catalyst from the regeneration zone. Fluidization of the catalyst particles by various gaseous streams allows the transport of catalyst between the reaction zone and regeneration zone. Spent catalyst from the reaction zone can be completely or partially regenerated in the regeneration zone.

A common objective of these configurations is maximizing product yield from the reactor while minimizing operating and equipment costs. Optimization of feedstock conversion ordinarily requires essentially complete removal of coke from the catalyst. This essentially complete removal of coke from catalyst is often referred to as complete regeneration. Complete regeneration produces a catalyst having less than 0.1 and preferably less than 0.05 wt-% coke. In order to obtain complete regeneration, the catalyst has to be in contact with oxygen at elevated temperature for sufficient residence time to permit thorough combustion.

Alternative processes are also used for light olefins production. In one approach, hydrocarbon oxygenates and more specifically methanol or dimethyl ether are used as an alternative feedstock for producing light olefin products. Once the oxygenates are formed, the process includes catalytically converting the oxygenates, such as methanol, into the desired light olefin products in a methanol to olefin (MTO) process. In the MTO process, carbonaceous material, i.e., coke, is deposited on the catalyst as it moved through the reaction zones. The carbonaceous material is removed from the catalyst by oxidative regeneration in one or more regeneration zones wherein a moving bed of the catalyst particles withdrawn from the reaction zones is contacted with an oxygen-containing gas stream at sufficient temperature and oxygen concentration to allow the desired amount of the carbonaceous materials to be removed by combustion from the catalyst. In some cases, it is advantageous to only partially regenerate the catalyst, e.g., to remove from about 30 to 80 wt-% of the carbonaceous material.

Conventional regenerators typically include a vessel having a coked catalyst inlet, a regenerated catalyst outlet and a combustion gas distributor for supplying air or other oxygen containing gas to the bed of catalyst that resides in the vessel. Cyclone separators remove catalyst entrained in the flue gas before the gas exits the regenerator.

Flue gas formed by burning the coke in the regenerator is treated for removal of particulates, other contaminants including $SO_x$, $NO_x$, HCN and conversion of carbon monoxide (CO), after which the flue gas is normally discharged into the atmosphere. Further, incomplete combustion to carbon dioxide can result from poor fluidization or aeration of the coked catalyst in the regenerator or poor distribution of coked catalyst into the regenerator. Generally, the flue gas exiting the regenerator contains CO, $CO_2$, $N_2$ and $H_2O$, along with smaller amounts of other species. The quantity of CO in the flue gas is based on the mode of regenerator operation by varying the quantity of air or $O_2$ to the regenerator. Flue gas treatment methods are effective, but the capital and operating costs are high.

Usually, the air is supplied to the regenerator at a much lower temperature as compared to the operating temperature of the regenerator. So, additional heat is required to raise the temperature of the incoming air to the operating temperature of the regenerator. This additional heat is supplied through the coke combustion. However, this requirement for air would lead to a comparatively higher coke formation in a heat balanced fluidized catalytic cracking process and also increases the $CO_2$ formation. This may increase the capital expenditure of the unit and that of the flue gas treatment of the unit by a proportionate amount.

Environmental concerns over greenhouse gas emissions have led to an increasing emphasis on separating the greenhouse gases before releasing the flue gases into atmosphere. Carbon dioxide ($CO_2$) is the most significant long-lived greenhouse gas in earth's atmosphere. $CO_2$ capture from flue gases is still expensive, both from a capital expenditures and operational utility costs standpoint. For fluidized catalytic processes, air is used for regenerating the spent catalyst. As a result of this operation, the CO2 in the FCC flue gas has a lower concentration in contrast to the concentrations of components not desired to be captured with CO2. This dynamic results in high capital expenditures due to a large volume of the flue gas, but also large operational expenses due to high solvent circulation rates and solvent regeneration duties. Apart from this, the flue gas requires extensive flue gas treatment prior to carbon capture in order to meet stringent specifications to avoid high solvent degradation rates requiring high capital expenditures and operational utility costs from more extensive impurities removal operations.

Therefore, there is a need for improved processes for regenerating catalyst from a fluidized catalytic process and the treatment of the flue gas containing $CO_2$. Also, there is a need for a process and an apparatus which reduces capital expenditures and operational utility costs of the flue gas treatment section, whilst improving energy efficiency and energy recovery.

SUMMARY

The present disclosure provides a process and an apparatus for regenerating catalyst from a fluidized catalytic process. Generally, air is used in the regenerator for burning the coke from spent catalyst. The air is supplied at a lower temperature than the temperature at which the regenerator is operating. So, the temperature of the incoming air stream needs to be elevated to the temperature at which the regenerator is operating. A significant amount of heat is needed just to heat the air to the temperature at which the regenerator is operating. However, this increase in heat demand for heating the air also results in significant coke generation and generation of $CO_2$ due to combustion and increases the overall cost of the unit for flue gas separation and treatment.

The present disclosure provides a process and an apparatus wherein a recycle stream is provided to the regenerator to heat up the incoming oxygen containing stream. The current process reduces or avoids the additional heat needed just for heating the incoming oxygen containing stream to raise its temperature to regeneration temperature. The present process also reduces coke generation, lowers capital and operational expenditures by reducing the intensity of flue gas treatment as compared to conventional air-based regeneration process.

A process for regenerating catalyst from a fluidized catalytic process in accordance with the present disclosure comprises passing a $CO_2$ oxidation stream to a regenerator in which coke is combusted from catalyst to provide a $CO_2$ rich flue gas stream. The $CO_2$ rich flue gas stream is separated into an underflow stream comprising catalyst fines and a $CO_2$ rich flue gas overflow stream. The overflow stream is separated into a recycle stream and a power recovery stream. The recycle stream of the overflow stream is recycled to the regenerator.

BRIEF DESCRIPTION OF THE DRAWINGS

The various embodiments will hereinafter be described in conjunction with the following FIGURES, wherein like numerals denote like elements.

DEFINITIONS

Figure 1:
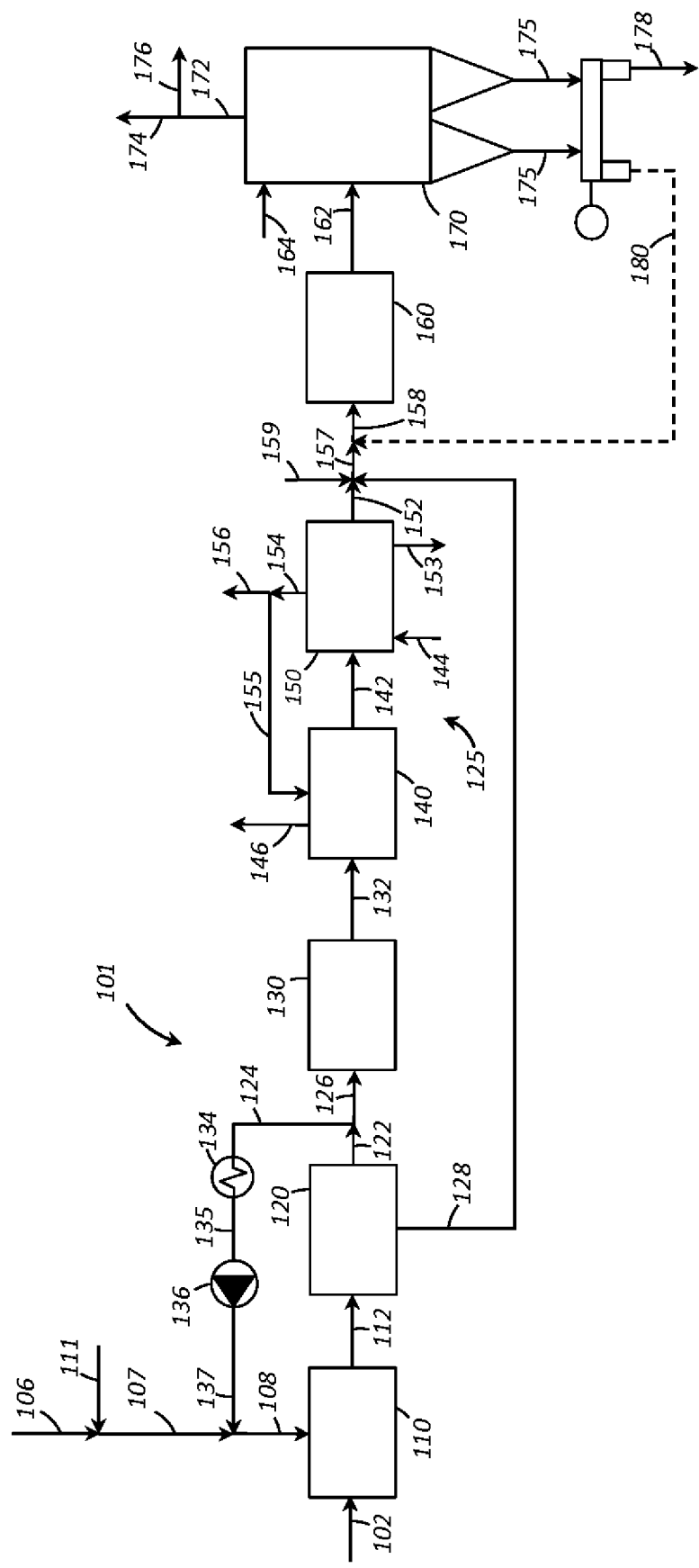
FIG. 1 is a schematic diagram of a process and an apparatus for regenerating catalyst from a fluidized catalytic process in accordance with an exemplary embodiment.

The term "communication" means that material flow is operatively permitted between enumerated components.

The term "downstream communication" means that at least a portion of material flowing to the subject in downstream communication may operatively flow from the object with which it communicates.

The term "upstream communication" means that at least a portion of the material flowing from the subject in upstream communication may operatively flow to the object with which it communicates.

The term "direct communication" or "directly" means that flow from the upstream component enters the downstream component without passing through a fractionation or conversion unit to undergo a compositional change due to physical fractionation or chemical conversion.

The term "column" means a distillation column or columns for separating one or more components of different volatilities. Unless otherwise indicated, each column includes a condenser on an overhead of the column to condense and reflux a portion of an overhead stream back to the top of the column and a reboiler at a bottom of the column to vaporize and send a portion of a bottoms stream back to the bottom of the column. Feeds to the columns may be preheated. The top pressure is the pressure of the overhead vapor at the vapor outlet of the column. The bottom temperature is the liquid bottom outlet temperature. Overhead lines and bottoms lines refer to the net lines from the column downstream of any reflux or reboil to the column. Stripper columns may omit a reboiler at a bottom of the column and instead provide heating requirements and separation impetus from a fluidized inert media such as steam. Stripper columns typically feed a top tray and take main product from the bottom.

As used herein, the term "a component-rich stream" means that the rich stream coming out of a vessel has a greater concentration of the component than the feed to the vessel.

As used herein, the term "separator" means a vessel which has an inlet and at least an overhead vapor outlet and a bottoms liquid outlet and may also have an aqueous stream outlet from a boot. A flash drum is a type of separator which may be in downstream communication with a separator that may be operated at higher pressure.

As used herein, the term "rich" means greater than 50%, suitably greater than 75% and preferably greater than 90%.

DETAILED DESCRIPTION

A process for regenerating catalyst from a fluidized catalytic process is disclosed. The fluidized catalytic process can be any fluid catalytic process that regenerates catalyst including an FCC process a MTO process or any such process. The present process discloses separating a recycle stream from the flue gas generated from a catalyst regenerator. The recycle stream is a $CO_2$ rich flue gas stream which is recycled to the regenerator. Applicants have found that recycling the $CO_2$ rich flue gas stream to the regenerator maintains the regenerator temperature, reduces the coke formation in the process, reduces the external heat requirement for the regenerator and reduces the overall capital expenditures for the unit. Applicants have also found that recycling the $CO_2$ rich flue gas stream also optimizes the overall yield of the process as the coke formation is reduced which in turn increases the overall yield of the process.

In an FCC process, the flue gas from the regenerator is generally passed to a third stage separator (TSS) to separate catalyst fines from the flue gas. A small quantity of flue gas with most of the catalyst fines is taken as an underflow stream from the TSS. The rest of the flue gas is separated in an overflow stream from the TSS. The catalyst fines from the underflow stream from the TSS are further separated. The underflow stream from the TSS may be passed to a fourth stage separator or filter or any other catalyst separation system to further separate the catalyst fines. Also, energy can be extracted from the overflow stream from the TSS in a heat exchanger. The overflow stream from the TSS can be separated into the $CO_2$ rich flue gas stream for recycle to the regenerator and the remaining overflow stream is passed to downstream for further utilization and/or recovery. After separating the recycle stream, the remaining overflow stream can be passed to an expander turbine, in which energy is extracted in the form of work. The expander may be coupled with the main air blower, providing power for blower operation or the air blower may be driven by a separate electric motor or steam turbine with expander output used solely for electric power generation. If the expander is coupled with the air blower, a motor/generator is required in the train to balance expander output with the air blower power requirement, and a steam turbine is included to assist with start-up. The steam turbine may be designed for continuous operation as an economic outlet for excess steam, or a less expensive turbine exhausting to atmosphere may be installed for use only during start-up. In an exemplary embodiment, the expander is coupled with generator for blue electricity generation.

In FIG. 1, in accordance with an exemplary embodiment, a process 101 is shown for regenerating catalyst from a fluidized catalytic process. The apparatus for regenerating catalyst comprises a regenerator unit 110, particulate removal section 120, a heat recovery section 125, a decontamination reactor 160, and a filter section 170. One aspect of the present disclosure comprises a process for regenerating catalyst from a fluidized catalytic process. The method comprises providing an oxygen containing stream in line 106 to the regenerator unit 110. In accordance with the present disclosure, the oxygen containing stream in line 106 may be selected from one or both of an air stream or an oxygen stream taken from an electrolyzer or an air separation unit (ASU). In an exemplary embodiment, the oxygen containing stream in line 106 is an oxygen stream taken from an air separation unit (ASU) or an electrolyzer. In another exemplary embodiment, the oxygen containing stream in line 106 is an air stream.

In accordance with the present disclosure, the oxygen containing stream in line 106 is mixed with a recycle stream in line 124 to provide a $CO_2$ oxidation stream in line 108. The $CO_2$ oxidation stream in line 108 is passed to the regenerator unit 110. A spent catalyst stream from a fluidized catalytic process in line 102 is also passed to the regenerator unit 110. In an aspect, the $CO_2$ oxidation stream in line 108 comprises an oxygen concentration of no more than 30 mole %.

In an aspect of the present disclosure, a diluent stream in line 111 is also provided and passed to the regenerator unit 110. It is found that while recycling the recycle stream in line 124 to the regenerator unit 110, the water concentration in the recycle gas loop may increase to as much as about 15 vol % or to as much as about 34 vol %. The water concentration in the recycle gas loop to the regenerator unit 110 may promote a hydrothermal deactivation of the catalyst. To avoid the hydrothermal deactivation of the catalyst, the present process passes a diluent stream in line 111 to the regenerator with the recycle stream in line 124. In an aspect of the present disclosure, the diluent stream in line 111 comprises $CO_2$. In an exemplary embodiment, the diluent stream in line 111 is a $CO_2$ rich diluent stream. In another exemplary embodiment, the diluent stream in line 111 is a $CO_2$ stream. In another aspect of the present disclosure, the diluent $CO_2$ stream in line 111 can be sourced from the fluidized catalytic process after purification. Also, the diluent $CO_2$ stream in line 111 can be sourced from a suitable source in the refinery as well. The diluent $CO_2$ stream will help to maintain the water concentration within the allowable range in the regenerator unit 110 and avoid any hydrothermal deactivation of the catalyst.

The diluent stream in line 111 can be combined with the oxygen containing stream in line 106 to provide a combined stream in line 107. The recycle stream in line 124 is mixed with the combined stream in line 107 to provide the $CO_2$ oxidation stream in line 108 which is passed to the regenerator unit 110. However, the diluent stream in line 111 can be passed to the regenerator unit 110 separately or directly.

In a fluidized catalytic process, catalyst particles are repeatedly circulated between a reaction zone and a catalyst regenerator unit 110. During regeneration, coke is deposited on the catalyst particles during reactions in the reaction zone and is removed at elevated temperatures by oxidation in the regenerator unit 110. The removal of coke deposits restores the activity of the catalyst particles to the point where they can be reused in the reaction zone. The present disclosure is directed towards optimizing the coke generated within the process and maintain the temperature/heat balance for the regenerator unit 110. The regenerated catalyst is withdrawn (not shown in FIG. 1) from the regenerator unit 110 and returned to the reaction zone.

From the regenerator unit 110, a $CO_2$ rich flue gas stream in line 112 is withdrawn. The $CO_2$ rich flue gas stream in line 112 comprises solids including catalyst fines, and particulates. The $CO_2$ rich flue gas stream in line 112 is passed to a particulate removal section 120. In accordance with an exemplary embodiment of the present disclosure, the particulate removal section 120 may be a third stage separator (TSS) (120).

The $CO_2$ rich flue gas stream in line 112 is passed to the TSS 120 to separate catalyst fines in an underflow stream in line 128. A $CO_2$ rich flue gas stream with reduced catalyst fines is separated in an overflow stream in line 122 from the TSS 120. The catalyst fines from the TSS 120 are further concentrated in the underflow stream in line 128.

In an embodiment of the present disclosure, the $CO_2$ rich flue gas stream with reduced catalyst fines in the overflow stream in line 122 is separated into a recycle stream in line 124 and a power recovery stream in line 126. The recycle stream in line 124 is recycled to the regenerator unit 110. In an exemplary embodiment, the recycle stream in line 124 is mixed with the oxygen containing stream in line 106 and the diluent $CO_2$ rich stream in line 111 to provide the $CO_2$ oxidation stream which is recycled to the regenerator unit 110. Alternatively, the recycle stream in line 124, the oxygen containing stream in line 106 and the diluent $CO_2$ rich stream in line 111 can be passed separately or directly to the regenerator unit 110.

In an aspect of the present disclosure, the recycle stream in line 124 is heat exchanged in a heat exchanger and compressed in a compressor before recycling the recycle stream in line 124 to the regenerator unit 110. The recycle stream in line 124 is passed through a heat exchanger 134 to reduce a temperature of the recycle stream in line 124 to provide a heat exchanged recycle stream in line 135. The heat exchanged recycle stream in line 135 is compressed in a compressor 136 to provide a heat exchanged and compressed recycle stream in line 137 having a temperature from about 260° C. (500° F.) to about 760° C. (1400° F.). The heat exchanged and compressed recycle stream in line 137 is passed to the regenerator unit 110. In an embodiment, the heat exchanged and compressed recycle stream in line 137 is mixed with the combined stream in line 107 to provide the $CO_2$ oxidation stream in line 108 which is passed to the regenerator unit 110. However, the heat exchanged and compressed recycle stream in line 137 may be passed separately or directly to the regenerator unit 110.

In an exemplary embodiment, the recycle stream in line 124 which is recycled to the regenerator unit 110 comprises from about 5 vol % to about 80 vol % of the overflow stream in line 122. In another exemplary embodiment, the recycle stream in line 124 which is recycled to the regenerator unit 110 comprises from about 10 vol % to about 60 vol % of the overflow stream in line 122. In yet another exemplary embodiment, the recycle stream in line 124 which is recycled to the regenerator unit 110 comprises from about 20 vol % to about 40 vol % of the overflow stream in line 122. In accordance with an aspect of the present disclosure, the recycle stream in line 124 comprises oxygen in an amount from about 0.01 mol % to about 5 mol % or from about 0.5 mol % to about 4 mol % or from about 0.5 mol % to about 2 mol % or from about 1 mol % to about 2 mol %.

The recycle stream is at a relatively higher temperature as compared to the oxygen containing stream entering into the regenerator unit 110. Applicants found that by passing the recycle stream at a higher temperature, the amount of heat generation needed within the regenerator for heating the incoming oxygen containing stream is reduced which in turn also reduces the amount of coke generation in the fluid catalytic process by at least 20 to 30% as compared with the case with no recycling (base case). Reducing the coke formation in the fluid catalytic process provides two advantages, first reducing the coke amount would result into additional product and thereby additional product revenue from the process and unit. Second, reducing the coke amount would also reduce the flue gas or the $CO_2$ which would be produced during the regeneration step in the regenerator unit 110. Applicants found that this could reduce the flue gas generation by at least 20 to 30% as compared with the case with no recycling (base case). This reduction also lowers the overall capital expenditures for the flue gas section of the unit by a proportionate amount due to the smaller volume of gas that must be transported and treated.

Total coke generation in a conventional fluidized catalytic cracking process comprises conversion coke, residue coke due to the nature of the feed, and additional coke which is produced to provide for heating any process streams such as hydrocarbon, air, or steam entering into the system. Usually, the oxygen containing stream entering the regenerator unit is at a temperature of about 130° C. (300° F.) to about 205° C. (400° F.), whereas the regenerator usually operates at a temperature of about 676° C. (1250° F.) to about 760° C. (1400° F.). So, the temperature of the oxygen containing stream needs to be elevated to this regenerator temperature. This heat comes from the coke combustion. So, the additional coke formation in the fluid catalytic process is associated with heating the incoming oxygen containing stream from about 205° C. (400° F.) to the regenerator temperature. The present process discloses bringing the recycle gas at a temperature of 260° C. (500° F.) to about 760° C. (1400° F.) to meet the heat balance on the regenerator side. This hot gas recycle reduces the delta heat needed to heat the incoming oxygen containing stream. This hot gas recycle now translates into a reduction of at least 20-30% of the coke generation in the unit. Applicants also found that hot gas recycling also helps in providing adequate density within the bed in the regenerator, so there is enough residence time for the combustion kinetics to appropriately take place. In the absence of adequate density within the bed, "after burn" in the regenerator can occur due to insufficient material to absorb the heat of combustion which will significantly increase the risk of heat damage to the equipment. The recycling of flue gas from the TSS provides direct heat to the incoming oxygen containing stream resulting in the aforesaid benefits to the process and unit.

In an exemplary embodiment, third stage separator operates at a temperature from about 649° C. (1200° F.) to about 760° C. (1400° F.). The recycle stream in line 124 can be partially cooled or heat exchanged and compressed before passing the recycle stream in line 124 to the regenerator unit 110. The recycle stream in line 124 may be heat exchanged in a heat exchanger and compressed before passing the recycle stream in line 124 to the regenerator unit 110. Alternatively, the recycle stream in line 124 may be passed through an air cooler and compressed before passing the recycle stream in line 124 to the regenerator unit 110. In an exemplary embodiment, the recycle stream in line 124 is recycled to the regenerator unit 110 at a temperature from about 260° C. (500° F.) to about 760° C. (1400° F.). In another exemplary embodiment, the recycle stream in line 124 is recycled to the regenerator unit 110 at a temperature from about 593° C. (1100° F.) to about 760° C. (1400° F.).

Returning to the TSS 120, the power recovery stream 126 of the $CO_2$ rich flue gas stream with reduced catalyst fines in the overflow stream in line 122 is passed to the flue gas expander 130 where energy is extracted in the form of work and/or electricity. In an aspect of the present disclosure, energy can be extracted from the power recovery stream 126 in the form of work in an expander turbine. In an exemplary embodiment, the expander 130 is coupled with a generator for blue electricity generation. After electricity generation, the power recovery stream now in line 132 from the flue gas expander 130 is passed to the heat recovery section 125. The flue gas expander 130 may be optional in accordance with the disclosed process for regenerating catalyst from a fluidized catalytic process. In an aspect of the present disclosure, the power recovery stream 126 may be passed directly to the heat recovery section 125. The heat recovery section 125 may be in direct communication with the TSS 120 via the power recovery stream 126. In an exemplary embodiment, the heat recovery section 125 is a heat recovery steam generator (HRSG) 125. The HRSG comprises a superheated steam section 140 and a saturated steam section 150. The power recovery stream in line 132 is passed to the superheated steam section 140 of the HRSG 125 to produce a superheated steam stream in line 146 and a heat exchanged $CO_2$ rich flue gas stream in line 142. The heat exchanged $CO_2$ rich flue gas stream in line 142 is sent to the saturated steam section 150 of the HRSG 125. In the saturated steam section 150, a boiler feed water stream 144 is heated by the heat exchanged with the $CO_2$ rich flue gas stream in line 142 forming a saturated steam stream in line 154 and a partially cooled $CO_2$ rich flue gas stream in line 152. A condensate stream in line 153 is withdrawn from the saturated steam section 150. A portion 155 of the saturated steam stream 154 is sent to the HRSG superheated steam section 140 to be superheated. The remainder 156 of the saturated steam stream 154 can be sent to other parts of the plant for use as needed. The partially cooled $CO_2$ rich flue gas stream in line 152 is withdrawn from the saturated steam section 150 and passed to the decontamination reactor 160.

The partially cooled $CO_2$ rich flue gas stream in line 152 is passed to the decontamination reactor 160. A reactant in line 159 is also passed to the decontamination reactor 160. In accordance with another aspect of the present disclosure, the decontamination reactor 160 may be a scrubber 160. In accordance with an aspect of the present disclosure, the decontamination reactor 160 can be operated at dry mode or wet mode. Therefore, the scrubber 160 can be a dry scrubber or a wet scrubber in accordance with the present process. In an exemplary embodiment, the reactant in line 159 is in dry form when the decontamination reactor 160 is operating under a dry mode or dry scrubbing. In an aspect, the partially cooled $CO_2$ rich flue gas stream in line 152 from the heat recovery section 125 is mixed with the dry reactant 159 to provide a mixed stream in line 157 and sent to the decontamination reactor 160 together in the mixed stream in line 157, alternatively as a combined decontaminant stream in line 158. In the decontamination reactor 160, the reactant reacts with sulfur-containing compounds and/or nitrogen-containing compounds in the partially cooled $CO_2$ rich flue gas stream in line 152 to form a reactor effluent stream comprising a reactant salt in line 162. The underflow stream in line 128 from the TSS 120 can also be passed directly to the decontamination reactor 160. In an exemplary embodiment, the underflow stream in line 128 is combined with the partially cooled $CO_2$ rich flue gas stream in line 152 and the reactant in line 159 and passed to the decontamination reactor 160 in the mixed stream in line 157. In another exemplary embodiment, the partially cooled $CO_2$ rich flue gas stream in line 152 and the underflow stream in line 128 are passed to the decontamination reactor 160 separately or directly.

In a wet mode operation or a wet scrubbing, the reactant in line 159 to the decontamination reactor 160 would be in liquid form. In accordance with an exemplary embodiment, the liquid reactant in line 159 may be selected from NaOH (aq) or KOH (aq). For wet scrubbing of the partially cooled $CO_2$ rich flue gas stream in line 152 in the decontamination reactor 160, the partially cooled $CO_2$ rich flue gas stream in line 152 would be quenched (not shown) to an adiabatic saturation temperature of about 60° C. (140° F.) to about 105° C. (220° F.) and thereafter passed to the decontamination reactor 160. In wet scrubbing, the liquid reactant NaOH or KOH will react with the $SO_X$ ($SO_2$ and/or $SO_3$) and form a liquid slurry effluent potentially consisting of sodium sulphate ($Na_2SO_4$) and/or sodium sulfite ($Na_2SO_3$), or potassium sulfite ($K_2SO_3$) and/or potassium sulphate ($K_2SO_4$) and $H_2O$, catalyst fines, and particulates. The liquid slurry effluent is withdrawn from the decontamination reactor 160. For a wet decontamination reactor 160, the filter section 170 may be omitted as the particles and/or catalyst fines are separated with the liquid slurry effluent which is withdrawn from the decontamination reactor 160.

In an exemplary embodiment, the decontamination reactor 160 operates at a temperature from about 200° C. to about 600° C. for reacting one or more of the sulfur-containing compound, the nitrogen-containing compound, or both in the partially cooled $CO_2$ rich flue gas stream in line 152 with the reactant 159 in dry form. In another exemplary embodiment, the reactant 159 comprises one or more of sodium hydroxide (NaOH), potassium hydroxide (KOH), sodium bicarbonate ($NaHCO_3$), calcium hydroxide ($Ca(OH)_2$) and trona salt ($Na_2CO_3 \cdot NaHCO_3 \cdot 2H_2O$). In yet another exemplary embodiment, the reactant salt comprises one or more of sodium sulfite ($Na_2SO_3$), potassium nitrate ($KNO_3$), potassium sulfate ($K_2SO_4$), sodium sulphate ($Na_2SO_4$), sodium carbonate ($Na_2CO_3$) and sodium nitrate ($NaNO_3$). The reactor effluent stream comprising reactant salt in line 162 is passed to a filter section 170 for particle removal.

The filter section 170 removes particulate and fines from the reactor effluent stream in line 162. Electrical current in line 164 is supplied to the filter section 170 when the filter section 170 comprises an electrostatic precipitator. The filter section 170 may also comprise a bag filter. The filtered material from the filter section 170 may include one or more of $Na_2SO_4$, $NaNO_3$, $NaNO_2$, $Na_2CO_3$, and catalyst fines which may be removed in the filter section 170. A filtered material in line 175 can be collected and removed from the process in line 178. Alternatively, or additionally, a filtered material may be recycled to the decontamination reactor 160 as a recycled filtered material in line 180 to increase the $Na_2CO_3$ conversion yield. The recycled filtered material in line 180 may be recycled with the mixed stream in line 157 and sent to the decontamination reactor 160 in the combined decontaminant stream in line 158. Thus, the reactant salt and catalyst fines are removed from the reactor effluent stream 162 in the filter section 170 to produce a filtered reactor effluent stream in line 172. A $CO_2$ stream for storage in line 174 is separated from the filtered reactor effluent stream in line 172. The remainder of the filtered reactor effluent stream in line 176 can be further used or prepared for release into the atmosphere as suitable. In an aspect of the present disclosure, the diluent $CO_2$ stream in line 111 is taken from the filtered reactor effluent stream in line 172. In an exemplary embodiment, the diluent $CO_2$ stream in line 111 is taken from the $CO_2$ stream for storage in line 174. In another exemplary embodiment, the diluent $CO_2$ stream in line 111 is taken from the remainder of the filtered reactor effluent stream in line 176.

Figure 2:
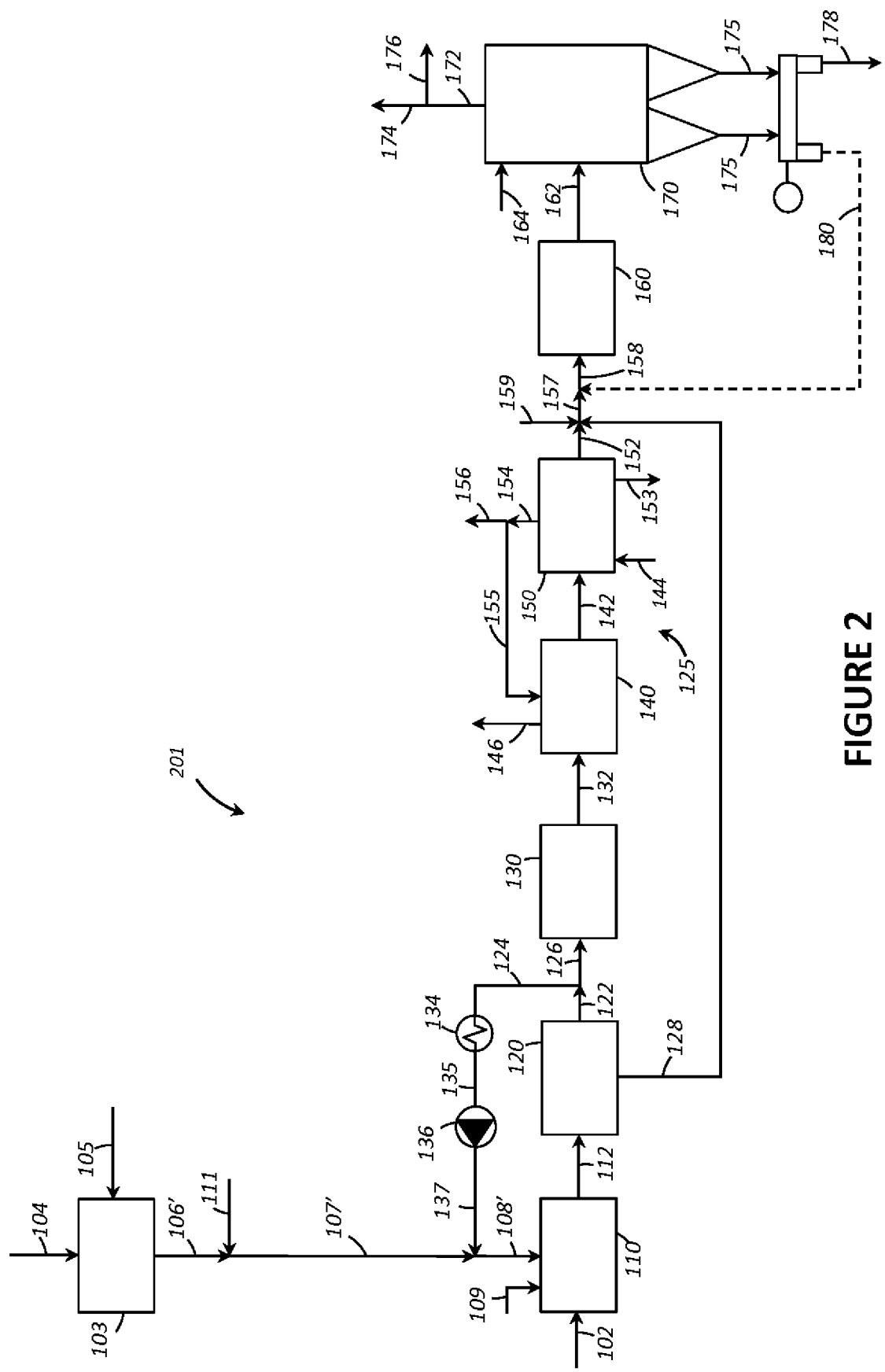
FIG. 2 is a schematic diagram of a process and an apparatus for regenerating catalyst from a fluidized catalytic process in accordance with another exemplary embodiment.

Turning now to FIG. 2, another exemplary embodiment of a process and an apparatus for regenerating catalyst from a fluidized catalytic process is addressed with reference to a process 201. Elements of FIG. 2 may have the same configuration as in FIG. 1 and bear the same respective reference number and have similar operating conditions. Elements in FIG. 2 that correspond to elements in FIG. 1 but have a different configuration bear the same reference numeral as in FIG. 1 but are marked with a prime symbol (').

As shown in FIG. 2, a process 201 is provided for regenerating catalyst from a fluidized catalytic process. The process 201 additionally comprises an electrolyzer or an air separation unit (ASU) 103. In accordance with an exemplary embodiment shown in FIG. 2, the oxygen containing stream is an oxygen stream 106' taken from an electrolyzer or an air separation unit (ASU) 103.

Various types of electrolyzer may be used as the electrolyzer 103 including but not limited to polymer electrolyte membrane/proton exchange membrane (PEM/PEMEC), alkaline electrolysis cell (AEC), anion exchange membrane (AEM), and solid oxide electrolysis cell (SOE/SOEC). In accordance with the present disclosure, the utilities generated in the fluidized catalytic process 201 may be used in the electrolysis section of the electrolyzer 103. The electricity generated in the flue gas expander 130 may be used to power the PEM, AEC, AEM and SOEC electrolyzer. In addition, for SOEC electrolyzer, heat in the form of superheated steam from line 146 could be used in the SOEC electrolyzer to reduce the need for imported utilities.

For the SOEC electrolyzer, about 25% to about 30% of the total energy requirement could be supplied by heat. In an exemplary embodiment, heat generated in fluidized bed flue gas section of the fluidized catalytic process may be supplied to the SOEC electrolyzer. Apart from taking heat generated in the fluidized catalytic process 201, other sources of heat in the fluidized catalyst process are also envisioned for integration. For example, heat may be recovered from the main column overhead of the fluidized catalytic process. Furthermore, apart from using electricity for splitting water, electricity generated in the process unit could also be used for compression in the AEC, AEM, and PEM electrolyzer. The electrolyzer 103 may use the electricity generated in the flue gas expander 130. In an exemplary embodiment, the electrolyzer 103 may use a portion of the electricity generated from the flue gas expander 130. In another exemplary embodiment, the electrolyzer 103 may use the thermal energy or steam generated in the fluidized catalytic process 201.

Referring to FIG. 2, the oxygen containing stream 106' is an oxygen stream taken from an electrolyzer 103. The electrolyzer 103 can be selected from one or more electrolyzer including but not limited to PEM/PEMEC, AEC, AEM, and SOE/SOEC. An air stream in line 104, and a water stream in line 105 are provided to the electrolyzer 103. Heat is also provided to the electrolyzer 103 from any suitable heat source. In an exemplary embodiment, the heat to the electrolyzer 103 may be supplied from any suitable process units of the fluidized catalytic process 201. However, heat to the electrolyzer 103 can be supplied from any other heat sources. The various utilities generated in the fluidized catalytic process can be used in the electrolyzer 103. Hydrogen (not shown) from the electrolyzer can be withdrawn. The oxygen stream is withdrawn in line 106' from the electrolyzer 103 and passed to the regenerator unit 110.

In an exemplary embodiment, the oxygen stream in line 106' is mixed with the recycle stream in line 124 from the TSS 120 to provide the $CO_2$ oxidation stream in line 108'. The $CO_2$ oxidation stream in line 108' is passed to the regenerator unit 110. In an aspect, the $CO_2$ oxidation stream comprises an oxygen concentration of no more than about 30 mole %. Alternatively, the recycle stream in line 124 and the oxygen stream in line 106' can be passed separately or directly to the regenerator unit 110. In an embodiment, an air stream in line 109 may also be passed to the regenerator unit 110. In an exemplary embodiment, the air stream in line 109 may be combined with the $CO_2$ oxidation stream in line 108' or the oxygen stream in line 106' and passed to the regenerator unit 110. The power recovery stream 126 of the $CO_2$ rich flue gas stream with reduced catalyst fines in the overflow stream in line 122 is passed to the flue gas expander 130. After electricity generation, the power recovery stream now in line 132 from the flue gas expander 130 is passed to the heat recovery section 125. In accordance with the exemplary embodiment shown in FIG. 2, the flue gas expander 130 may be optional. In an aspect of the present disclosure, the power recovery stream 126 may be passed directly to the heat recovery section 125. The heat recovery section 125 may be in direct communication with the TSS 120 via the power recovery stream 126.

In an aspect of the present disclosure, a diluent stream in line 111 may also be passed to the regenerator unit 110. The diluent stream in line 111 can be combined with the oxygen containing stream in line 106' to provide a combined stream in line 107'. The recycle stream in line 124 is mixed with the combined stream in line 107' to provide the $CO_2$ oxidation stream in line 108' which is passed to the regenerator unit 110. However, the diluent stream in line 111 can be passed to the regenerator unit 110 separately or directly. Thus, the oxygen stream in line 106', the diluent stream in line 111, the recycle stream in line 124 from the TSS 120, and the air stream in line 109 may be passed to the regenerator unit 110. In an exemplary embodiment, the diluent stream in line 111 is a $CO_2$ rich diluent stream. In another exemplary embodiment, the diluent stream in line 111 is a $CO_2$ stream. In an aspect of the present disclosure, the diluent $CO_2$ stream in line 111 can be sourced from the fluidized catalytic process after purification. Also, the diluent $CO_2$ stream in line 111 can be sourced from any suitable source in the refinery as well. In an aspect of the present disclosure, the diluent $CO_2$ stream in line 111 is sourced from the filtered reactor effluent stream in line 172. In an exemplary embodiment, the diluent $CO_2$ stream in line 111 is taken from the $CO_2$ stream for storage in line 174. In another exemplary embodiment, the diluent $CO_2$ stream in line 111 is taken from the remainder of the filtered reactor effluent stream in line 176. The rest of the process 201 is same as described in FIG. 1.

Any of the above lines, conduits, units, devices, vessels, surrounding environments, zones or similar may be equipped with one or more monitoring components including sensors, measurement devices, data capture devices or data transmission devices. Signals, process or status measurements, and data from monitoring components may be used to monitor conditions in, around, and on process equipment. Signals, measurements, and/or data generated or recorded by monitoring components may be collected, processed, and/or transmitted through one or more networks or connections that may be private or public, general or specific, direct or indirect, wired or wireless, encrypted or not encrypted, and/or combination(s) thereof, the specification is not intended to be limiting in this respect. Further, the figure may include one or more exemplary sensors located on one or more conduits. Nevertheless, there may be sensors present on every stream so that the corresponding parameter(s) can be controlled accordingly.

Signals, measurements, and/or data generated or recorded by monitoring components may be transmitted to one or more computing devices or systems. Computing devices or systems may include at least one processor and memory storing computer-readable instructions that, when executed by the at least one processor, cause the one or more computing devices to perform a process that may include one or more steps. For example, the one or more computing devices may be configured to receive, from one or more monitoring component, data related to at least one piece of equipment associated with the process. The one or more computing devices or systems may be configured to analyze the data. Based on analyzing the data, the one or more computing devices or systems may be configured to determine one or more recommended adjustments to one or more parameters of one or more processes described herein. The one or more computing devices or systems may be configured to transmit encrypted or unencrypted data that includes the one or more recommended adjustments to the one or more parameters of the one or more processes described herein.

EXAMPLE

A comparative analysis was conducted for the current process of recycling the recycle stream in line 124 of the overflow stream from the TSS to the regenerator unit 110. The current process was compared with a base case process with no recycling of the overflow stream from the TSS to the regenerator unit 110. The results are shown in TABLE A below:

TABLE A

| Conversion, wt. % | Base Case Coke Yield, wt. % | With recycle stream Coke Yield, wt. % | % Reduction in coke generation |
|---|---|---|---|
| 70 | 5.1 | 3.57 | 30 |
| 75 | 5.4 | 3.94 | 27 |
| 80 | 5.7 | 4.33 | 24 |
| 85 | 6 | 4.74 | 21 |

Figure 3:
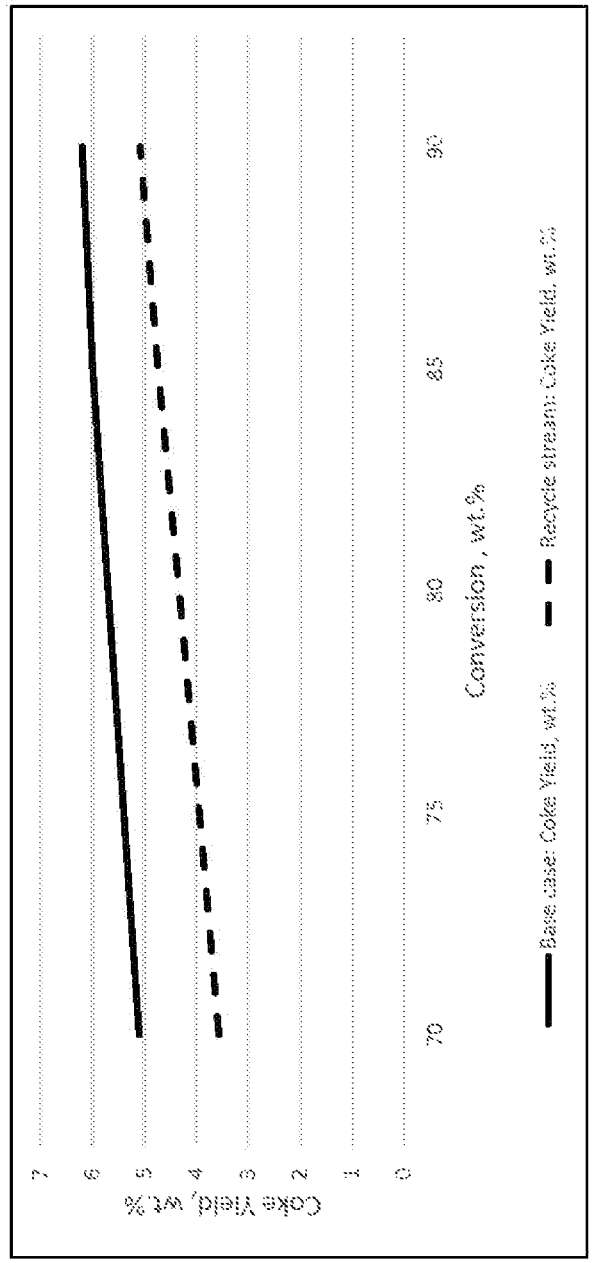
FIG. 3 is a graph plotted for coke yield (wt %) vs conversion (wt %) for the process for regenerating catalyst from a fluidized catalytic process in accordance with the present disclosure and a base case process.

The results are also plotted and shown in FIG. 3. As evident from the Table and FIG. 3, the present process of recycling the recycle stream in line 124 of the overflow stream from the TSS to the regenerator unit 110 forms less coke as compared to the base case with no recycle. The present process of passing the recycle stream in line 124 to the regenerator generates 20-30% less coke as compared to the base case.

SPECIFIC EMBODIMENTS

While the following is described in conjunction with specific embodiments, it will be understood that this description is intended to illustrate and not limit the scope of the preceding description and the appended claims.

A first embodiment of the present disclosure is a process for regenerating catalyst from a fluidized catalytic process comprising passing a $CO_2$ oxidation stream to a regenerator in which coke is combusted from catalyst to provide a $CO_2$ rich flue gas stream; separating the $CO_2$ rich flue gas stream into an underflow stream comprising catalyst fines and a $CO_2$ rich flue gas overflow stream; separating the overflow stream into a recycle stream and a power recovery stream; and passing the recycle stream to the regenerator. An embodiment of the present disclosure is one, any or all of prior embodiments in this paragraph up through the first embodiment in this paragraph further comprising mixing an oxygen containing stream, a diluent stream comprising $CO_2$, and the recycle stream to provide the $CO_2$ oxidation stream. An embodiment of the present disclosure is one, any or all of prior embodiments in this paragraph up through the first embodiment in this paragraph wherein the oxygen containing stream is selected from one or both of an air stream or an oxygen stream taken from an electrolyzer or an air separation unit (ASU). An embodiment of the present disclosure is one, any or all of prior embodiments in this paragraph up through the first embodiment in this paragraph wherein the $CO_2$ oxidation stream comprises an oxygen concentration of no more than 30 mole %. An embodiment of the present disclosure is one, any or all of prior embodiments in this paragraph up through the first embodiment in this paragraph wherein the recycle stream comprises from about 5 vol % to about 80 vol % of the overflow stream. An embodiment of the present disclosure is one, any or all of prior embodiments in this paragraph up through the first embodiment in this paragraph further comprising reducing a temperature of the recycle stream in a heat exchanger to provide a heat exchanged recycle stream having a temperature from about 260° C. (500° F.) to about 760° C. (1400° F.); and passing the heat exchanged recycle stream to the regenerator. An embodiment of the present disclosure is one, any or all of prior embodiments in this paragraph up through the first embodiment in this paragraph further comprising compressing the heat exchanged recycle stream to provide a heat exchanged and compressed recycle stream having a temperature from about 260° C. (500° F.) to about 760° C. (1400° F.); and passing the heat exchanged and compressed recycle stream to the regenerator. An embodiment of the present disclosure is one, any or all of prior embodiments in this paragraph up through the first embodiment in this paragraph wherein the recycle stream comprises oxygen in an amount from about 0.01 mol % to about 5 mol %. An embodiment of the present disclosure is one, any or all of prior embodiments in this paragraph up through the first embodiment in this paragraph wherein the step of separating the $CO_2$ rich flue gas stream comprises passing the $CO_2$ rich flue gas stream to a third stage separator to provide the underflow stream and the overflow stream. An embodiment of the present disclosure is one, any or all of prior embodiments in this paragraph up through the first embodiment in this paragraph, wherein the third stage separator is operating at a temperature from about 649° C. (1200° F.) to about 760° C. (1400° F.) and the recycle stream is recycled to the regenerator at a temperature from about 260° C. (500° F.) to about 760° C. (1400° F.). An embodiment of the present disclosure is one, any or all of prior embodiments in this paragraph up through the first embodiment in this paragraph further comprising transferring heat from the power recovery stream to a boiler feed water stream in a heat recovery section to form a partially cooled $CO_2$ rich flue gas stream and a steam stream; passing the partially cooled $CO_2$ rich flue gas stream and the underflow stream to a decontamination reactor; reacting one or more of a sulfur-containing compound, a nitrogen-containing compound, or both in the partially cooled $CO_2$ rich flue gas stream and/or the underflow stream with a reactant in the decontamination reactor to form a reactor effluent stream comprising reactant salt; filtering the reactor effluent stream to remove the reactant salt and catalyst fines to produce a filtered reactor effluent stream; and separating the diluent stream from the filtered reactor effluent stream. An embodiment of the present disclosure is one, any or all of prior embodiments in this paragraph up through the first embodiment in this paragraph further comprising transferring heat from the power recovery stream to a boiler feed water stream in a heat recovery section to form a partially cooled $CO_2$ rich flue gas stream and a steam stream; quenching the partially cooled CO2 rich flue gas stream to an adiabatic saturation temperature of about 60° C. to about 105° C. (140° F. to 220° F.) to provide a quenched gas stream; scrubbing the quenched gas stream with a liquid reactant comprising one or more of sodium hydroxide (NaOH) and potassium hydroxide (KOH) to produce CO2 rich reactor effluent stream. An embodiment of the present disclosure is one, any or all of prior embodiments in this paragraph up through the first embodiment in this paragraph, wherein the heat recovery section is a heat recovery steam generator (HRSG) comprising transferring heat from the power recovery stream to a boiler feed water stream in the HRSG to form the partially cooled $CO_2$ rich flue gas stream and the steam stream; and passing the partially cooled $CO_2$ rich flue gas stream to the decontamination reactor. An embodiment of the present disclosure is one, any or all of prior embodiments in this paragraph up through the first embodiment in this paragraph wherein the HRSG comprises a superheated steam section and a saturated steam section. An embodiment of the present disclosure is one, any or all of prior embodiments in this paragraph up through the first embodiment in this paragraph further comprising passing the power recovery stream into the superheated steam section of the HRSG to produce a superheated steam stream and a heat exchanged $CO_2$ rich flue gas stream; passing a boiler feed water stream and the heat exchanged $CO_2$ rich flue gas stream into the saturated steam section of the HRSG to form the partially cooled $CO_2$ rich flue gas stream and a saturated steam stream; introducing at least a portion of the saturated steam stream into the superheated steam section of the HRSG; and superheating the saturated steam stream with the $CO_2$ rich flue gas stream to produce the superheated steam stream. An embodiment of the present disclosure is one, any or all of prior embodiments in this paragraph up through the first embodiment in this paragraph wherein the reactant comprises one or more of sodium hydroxide (NaOH), potassium hydroxide (KOH), sodium bicarbonate ($NaHCO_3$), calcium hydroxide ($Ca(OH)_2$) and trona salt ($Na_2CO_3 \cdot NaHCO_3 \cdot 2H_2O$). An embodiment of the present disclosure is one, any or all of prior embodiments in this paragraph up through the first embodiment in this paragraph wherein the reactant salt comprises one or more of sodium sulfite ($Na_2SO_3$), potassium nitrate ($KNO_3$), potassium sulfate ($K_2SO_4$), sodium sulphate ($Na_2SO_4$), sodium carbonate ($Na_2CO_3$) and sodium nitrate ($NaNO_3$).

A second embodiment of the present disclosure is a process for regenerating catalyst from a fluidized catalytic process comprising passing a $CO_2$ oxidation stream to a regenerator in which coke is combusted from catalyst to provide a $CO_2$ rich flue gas stream; separating the $CO_2$ rich flue gas stream into an underflow stream comprising catalyst fines and a $CO_2$ rich flue gas overflow stream; separating the overflow stream into a recycle stream and a power recovery stream; and combining the recycle stream of the overflow stream with an air stream, and a diluent stream comprising $CO_2$ to provide the $CO_2$ oxidation stream. An embodiment of the present disclosure is one, any or all of prior embodiments in this paragraph up through the second embodiment in this paragraph wherein the recycle stream comprises from about 10 vol % to about 60 vol % of the overflow stream. An embodiment of the present disclosure is one, any or all of prior embodiments in this paragraph up through the second embodiment in this paragraph further comprising reducing a temperature of the recycle stream in a heat exchanger to provide a heat exchanged recycle stream and compressing the heat exchanged recycle stream to provide a heat exchanged and compressed recycle stream having a temperature from about 260° C. (500° F.) to about 760° C. (1400° F.); and combing the heat exchanged and compressed recycle stream with the air stream and CO2 rich diluent stream to provide the $CO_2$ oxidation stream.

A third embodiment of the present disclosure is a process for regenerating catalyst from a fluidized catalytic process comprising passing a $CO_2$ oxidation stream to a regenerator in which coke is combusted from catalyst to provide a $CO_2$ rich flue gas stream; separating the $CO_2$ rich flue gas stream into an underflow stream comprising catalyst fines and a $CO_2$ rich flue gas overflow stream; separating the overflow stream into a recycle stream and a power recovery stream; reducing a temperature of the recycle stream in a heat exchanger to provide a heat exchanged recycle stream and compressing the heat exchanged recycle stream in a compressor to provide a heat exchanged and compressed recycle stream having a temperature from about 260° C. (500° F.) to about 760° C. (1400° F.); and combining the heat exchanged and compressed recycle stream with an oxygen containing stream and a diluent stream comprising $CO_2$ to provide the $CO_2$ oxidation stream.

A fourth embodiment of the present disclosure is a process for regenerating catalyst from a fluidized catalytic process comprising passing an oxidation stream to a regenerator in which coke is combusted from catalyst to provide a $CO_2$ rich flue gas stream; separating the $CO_2$ rich flue gas stream into an underflow stream comprising catalyst fines and a $CO_2$ rich flue gas overflow stream; separating the overflow stream into a recycle stream and a process stream; and passing the recycle stream to the regenerator.

Without further elaboration, it is believed that using the preceding description that one skilled in the art can utilize the present disclosure to its fullest extent and easily ascertain the essential characteristics of this disclosure, without departing from the spirit and scope thereof, to make various changes and modifications of the disclosure and to adapt it to various usages and conditions. The preceding preferred specific embodiments are, therefore, to be construed as merely illustrative, and not limiting the remainder of the disclosure in any way whatsoever, and that it is intended to cover various modifications and equivalent arrangements included within the scope of the appended claims.

In the foregoing, all temperatures are set forth in degrees Celsius and, all parts and percentages are by weight, unless otherwise indicated.

The invention claimed is:

1. A process for regenerating catalyst from a fluidized catalytic process comprising:
   passing a $CO_2$ oxidation stream to a regenerator in which coke is combusted from catalyst to provide a $CO_2$ rich flue gas stream;
   separating said $CO_2$ rich flue gas stream into an underflow stream comprising catalyst fines and a CO2 rich flue gas overflow stream;
   separating said overflow stream into a recycle stream and a power recovery stream; and
   passing said recycle stream to the regenerator.

2. The process of claim 1 further comprising mixing an oxygen containing stream, a diluent stream comprising $CO_2$, and said recycle stream to provide said $CO_2$ oxidation stream.

3. The process of claim 2 wherein said oxygen containing stream is selected from one or both of an air stream or an oxygen stream taken from an electrolyzer or an air separation unit (ASU).

4. The process of claim 1 wherein said $CO_2$ oxidation stream comprises an oxygen concentration of no more than 30 mole %.

5. The process of claim 1 wherein said recycle stream comprises from about 5 vol % to about 80 vol % of the overflow stream.

6. The process of claim 1 further comprising:
   reducing a temperature of said recycle stream in a heat exchanger to provide a heat exchanged recycle stream having a temperature from about 260° C. (500° F.) to about 760° C. (1400° F.); and
   passing said heat exchanged recycle stream to the regenerator.

7. The process of claim 6 further comprising:
   compressing said heat exchanged recycle stream to provide a heat exchanged and compressed recycle stream having a temperature from about 260° C. (500° F.) to about 760° C. (1400° F.); and
   passing said heat exchanged and compressed recycle stream to the regenerator.

8. The process of claim 1 wherein said recycle stream comprises oxygen in an amount from about 0.01 mol % to about 5 mol %.

9. The process of claim 1 wherein the step of separating said $CO_2$ rich flue gas stream comprises passing said $CO_2$ rich flue gas stream to a third stage separator to provide said underflow stream and said overflow stream.

10. The process of claim 9, wherein the third stage separator is operating at a temperature from about 649° C. (1200° F.) to about 760° C. (1400° F.) and said recycle stream is recycled to said regenerator at a temperature from about 260° C. (500° F.) to about 760° C. (1400° F.).

11. The process of claim 2 further comprising:
   transferring heat from said power recovery stream to a boiler feed water stream in a heat recovery section to form a partially cooled $CO_2$ rich flue gas stream and a steam stream;
   passing said partially cooled $CO_2$ rich flue gas stream and said underflow stream to a decontamination reactor;
   reacting one or more of a sulfur-containing compound, a nitrogen-containing compound, or both in said partially cooled $CO_2$ rich flue gas stream and/or said underflow stream with a reactant in said decontamination reactor to form a reactor effluent stream comprising reactant salt;

filtering the reactor effluent stream to remove the reactant salt and catalyst fines to produce a filtered reactor effluent stream; and separating said diluent stream from said filtered reactor effluent stream.

12. The process of claim 11, wherein said heat recovery section is a heat recovery steam generator (HRSG) comprising:

transferring heat from said power recovery stream to a boiler feed water stream in said HRSG to form said partially cooled $CO_2$ rich flue gas stream and said steam stream; and passing said partially cooled $CO_2$ rich flue gas stream to said decontamination reactor.

13. The process of claim 12 wherein the HRSG comprises a superheated steam section and a saturated steam section.

14. The process of claim 13 further comprising:

passing said power recovery stream into the superheated steam section of said HRSG to produce a superheated steam stream and a heat exchanged $CO_2$ rich flue gas stream;

passing a boiler feed water stream and said heat exchanged $CO_2$ rich flue gas stream into the saturated steam section of the HRSG to form said partially cooled $CO_2$ rich flue gas stream and a saturated steam stream;

introducing at least a portion of the saturated steam stream into the superheated steam section of the HRSG; and superheating the saturated steam stream with said $CO_2$ rich flue gas stream to produce the superheated steam stream.

15. The process of claim 11 wherein said reactant comprises one or more of sodium hydroxide (NaOH), potassium hydroxide (KOH), sodium bicarbonate ($NaHCO_3$), calcium hydroxide ($Ca(OH)_2$) and trona salt ($Na_2CO_3 \cdot NaHCO_3 \cdot 2H_2O$).

16. The process of claim 11 wherein the reactant salt comprises one or more of sodium sulfite ($Na_2SO_3$), potassium nitrate ($KNO_3$), potassium sulfate ($K_2SO_4$), sodium sulphate ($Na_2SO_4$), sodium carbonate ($Na_2CO_3$) and sodium nitrate ($NaNO_3$).

17. A process for regenerating catalyst from a fluidized catalytic process comprising:

passing a $CO_2$ oxidation stream to a regenerator in which coke is combusted from catalyst to provide a $CO_2$ rich flue gas stream;

separating said $CO_2$ rich flue gas stream into an underflow stream comprising catalyst fines and a $CO_2$ rich flue gas overflow stream;

separating said overflow stream into a recycle stream and a power recovery stream; and combining said recycle stream of the overflow stream with an air stream and a diluent stream comprising $CO_2$ to provide said $CO_2$ oxidation stream.

18. The process of claim 17 wherein said recycle stream comprises from about 10 vol % to about 60 vol % of the overflow stream.

19. The process of claim 17 further comprising:

reducing a temperature of said recycle stream in a heat exchanger to provide a heat exchanged recycle stream and compressing the heat exchanged recycle stream to provide a heat exchanged and compressed recycle stream having a temperature from about 260° C. (500° F.) to about 760° C. (1400° F.); and combing said heat exchanged and compressed recycle stream with said air stream and CO2 rich diluent stream to provide said $CO_2$ oxidation stream.

20. A process for regenerating catalyst from a fluidized catalytic process comprising:

passing a $CO_2$ oxidation stream to a regenerator in which coke is combusted from catalyst to provide a $CO_2$ rich flue gas stream;

separating said $CO_2$ rich flue gas stream into an underflow stream comprising catalyst fines and a $CO_2$ rich flue gas overflow stream;

separating said overflow stream into a recycle stream and a power recovery stream;

reducing a temperature of said recycle stream in a heat exchanger to provide a heat exchanged recycle stream and compressing the heat exchanged recycle stream in a compressor to provide a heat exchanged and compressed recycle stream having a temperature from about 260° C. (500° F.) to about 760° C. (1400° F.); and combining said heat exchanged and compressed recycle stream with an oxygen containing stream and a diluent stream comprising $CO_2$ to provide said $CO_2$ oxidation stream.

* * * * *